No. 775,603. PATENTED NOV. 22, 1904.
F. C. JAHNKE.
POULTRY ROOST.
APPLICATION FILED MAR. 3, 1904.
NO MODEL.
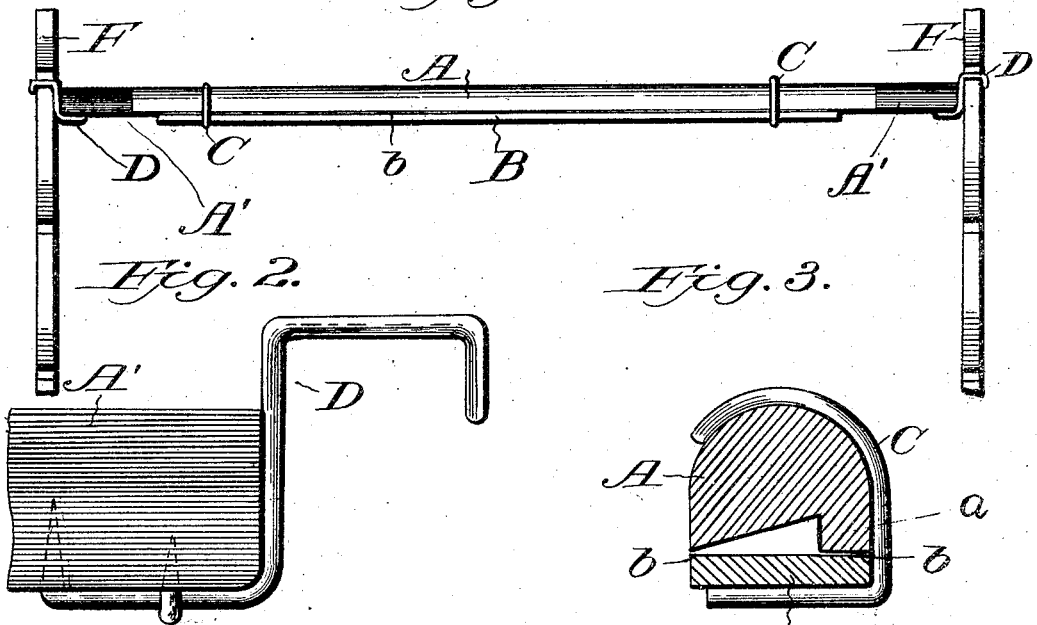
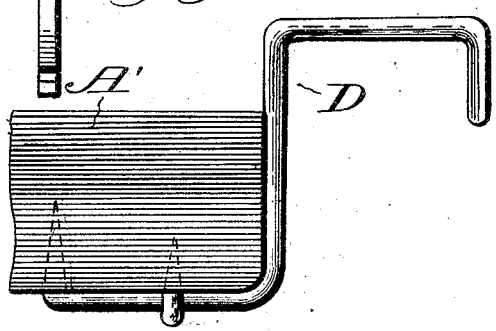
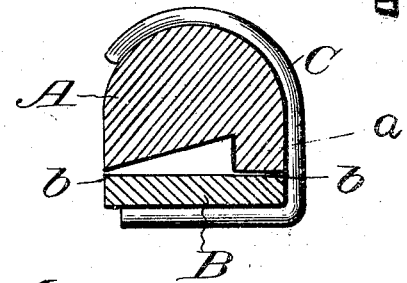
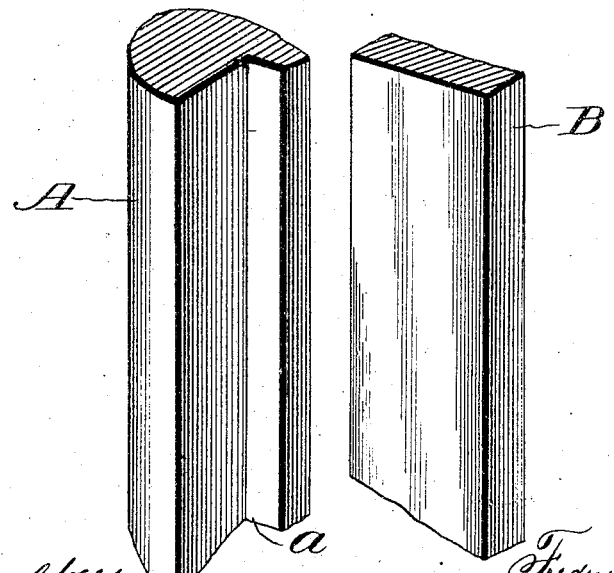
WITNESSES:
C. H. Walker,
James R. Mansfield.
INVENTOR
Frederick C. Jahnke,
By Alexander H. Dowell
Attorneys.

No. 775,603.

Patented November 22, 1904.

UNITED STATES PATENT OFFICE.

FREDERICK C. JAHNKE, OF LONETREE, IOWA.

POULTRY-ROOST.

SPECIFICATION forming part of Letters Patent No. 775,603, dated November 22, 1904.

Application filed March 3, 1904. Serial No. 196,395. (No model.)

*To all whom it may concern:*

Be it known that I, FREDERICK C. JAHNKE, of Lonetree, in the county of Johnson and State of Iowa, have invented certain new and useful Improvements in Poultry-Roosts; and I hereby declare that the following is a full, clear, and exact description thereof, reference being had to the accompanying drawings, which form part of this specification.

This invention is an improvement in poultry-roosts and insect-traps, its special object being to construct a roost which can be readily taken down and put up and which also constitutes a trap or decoy for the vermin that invest poultry as ordinarily housed.

The particular object of the invention is to provide the roost-bars with a groove or recess closed by a removable strip and forming a dark chamber into which the vermin will naturally crawl to conceal themselves during the day, emerging at night to again attack the fowls.

Practical experience has shown that the chicken-lice are particularly aggressive at night while the fowls are at rest, and they seek to escape at the approach of day by crawling down to the roost-bars and hiding themselves in crevices therein. In view of this fact I have devised and made my improved roost-bar with a convenient resting-place for the vermin, so that they may conceal themselves therein at night, and an attendant can during the day readily remove the roost-bars upon the chambers and cleanse them of vermin and replace them, so that by the proper and continued use of these bars it is possible to very rapidly trap and remove all the vermin which may infest the fowl, resulting in much healthier and cleaner and more productive fowls.

Figure 1 is a side view of one of the complete roost-bars and the supports. Fig. 2 is an enlarged detail view of one end of the roost-bar detached. Fig. 3 is an enlarged transverse section through one of said bars. Fig. 4 is a detailed view showing parts of the bar separated.

My improved roost-bar consists, essentially, of a main roost-bar A of any suitable length, which is preferably rounded on its upper side and has a groove $a$ in its under side extending longitudinally thereof. Fitted to the under side of this bar and covering the groove is a thin wooden strip B, which is removably attached to the bar by means of the spring-clips C, which are shaped to embrace the bar. The meeting surfaces of the strip B and bar A should be fitted roughly together, so as to leave cracks or apertures $b$ at the sides therebetween, through which insects can readily crawl into the chamber $a$. The chamber $a$ is simply provided to increase the capacity of the trap and is not altogether an indispensable feature; but I preferably use it as such, as it insures an easier fit between the strip and bar and prevents outward warping of the latter.

The bars are preferably provided with hooks D at the ends, by which they may be suspended in position from notches in the supporting-bars F, as shown, the hooks D engaging in said bars and retaining the roost securely in place while allowing it to be readily lifted therefrom. The strips B terminate within a few inches of the end of the bars A, and the ends or extremities of the bars A are painted, as indicated at A', while the rest of the bar and strip are of plain wood. I have found that this simple expedient of painting the ends in this manner will prevent the vermin crawling off the bars, and they will naturally hide themselves in the dark space between the strip and bar.

Owing to the special shape of the hangers D, the roost-bars will be suspended in proper horizontal position whether the supports F are arranged horizontally or at an angle, they being indicated as arranged on an angle in the drawings, and the entire weight of the bar being below the point of support the roosts are steady.

Where these roost-bars are used, it is desirable that they should be taken down for the first two or three mornings, the strips removed, and the inner faces of the strip and bar cleaned of the vermin hiding therebetween. Thereafter an occasional cleaning of the bar in this manner will practically keep the bars free from vermin.

I have practically tested these bars, and the statements herein regarding the tendency of the vermin to seek a dark resting-place during the day instead of staying on the fowl is a demonstrated fact.

Having thus described my invention, I claim—

1. The herein-described poultry-roost, comprising a bar provided with means for supporting it at its ends, and a strip loosely attached to the bottom of the bar, the space between the strip and bar forming a hiding-place for vermin, and means for removably holding said bar and strip in contact, substantially as described.

2. The herein-described poultry-roost bar, comprising the bar provided at its ends with means for suspending it in place, and a strip on the under side of the bar, and clips removably holding said strip in place.

3. The herein-described poultry-roost, comprising a bar having rounded upper edges, a grooved under surface, a covering-strip therefor, and means for holding said strip in contact with said bar, all substantially as described.

4. The herein-described poultry-roost, comprising the notched side bar F, the roost-bars having suspending-hooks on their ends, and a strip removably attached to the under side of said roost-bars, substantially as described.

5. A poultry-roost, comprising the bar A having a rounded upper surface, a grooved lower under surface, a removable strip fitted to the under surface of the bar, and the wire clips holding the strip against the bar, the extremities of said bar being painted, substantially as described.

In testimony that I claim the foregoing as my own I affix my signature in presence of two witnesses.

FRED. C. JAHNKE.

In presence of—
 HENRY E. PORTER,
 WM. ZIMMERMAN.